United States Patent
Muraki et al.

(10) Patent No.: US 6,761,485 B2
(45) Date of Patent: Jul. 13, 2004

(54) ROLLING BEARING UNIT

(75) Inventors: Hiromitsu Muraki, Fujisawa (JP); Takafumi Yasuhara, Fujisawa (JP)

(73) Assignee: NSK Ltd., Tokyo (JP)

( * ) Notice: Subject to any disclaimer, the term of this patent is extended or adjusted under 35 U.S.C. 154(b) by 56 days.

(21) Appl. No.: 10/187,306

(22) Filed: Jul. 1, 2002

(65) Prior Publication Data

US 2004/0001657 A1 Jan. 1, 2004

(51) Int. Cl.[7] ............................ F16C 33/60; G11B 17/02
(52) U.S. Cl. ...................... 384/504; 384/537; 360/99.08
(58) Field of Search ................................. 384/490, 499, 384/501, 502, 504, 537; 310/90; 360/98.07, 99.08

(56) References Cited

U.S. PATENT DOCUMENTS

| | | | | |
|---|---|---|---|---|
| 4,480,881 A | * | 11/1984 | Fujimori | ...................... 310/90 |
| 4,818,907 A | * | 4/1989 | Shirotori | .................. 360/99.08 |
| 4,882,643 A | * | 11/1989 | Shirotori | .................. 360/99.08 |
| 4,900,958 A | * | 2/1990 | Kitahara et al. | ............. 384/517 |
| 5,045,738 A | * | 9/1991 | Hishida et al. | ................ 310/90 |
| 5,274,288 A | * | 12/1993 | Stefansky | ...................... 310/90 |
| 5,381,066 A | * | 1/1995 | Miyaji et al. | .................. 310/90 |
| 5,606,475 A | * | 2/1997 | Ishizuka | ................... 360/99.08 |
| 5,687,016 A | * | 11/1997 | Seto | ............................. 384/490 |
| 5,945,751 A | * | 8/1999 | Hans et al. | ............... 360/98.07 |

FOREIGN PATENT DOCUMENTS

JP                401164815        *  6/1989   ................. 384/490

* cited by examiner

Primary Examiner—Thomas R. Hannon
(74) Attorney, Agent, or Firm—Katten Muchin Zavis Rosenman

(57) ABSTRACT

Two bearings 3, 4 are used to rotatably support the pivot 1 with reference to a fixed shaft. The swing arm 5 is highly precisely fixed to the pivot 1. The outer diameter 4b of the outer race 4a of the lower bearing 4 is larger than the outer diameter 3b of the outer race 3a of the upper bearing 3. The end surface of the outer race 4b of the outer race 4a of the lower bearing 4 and the outer periphery 3b of the outer race 3a of the upper ball bearing 3 are used as a reference surface to fix the swing arm 5. The housing used in the prior art is eliminated from the structure according to the present invention to reduce the number of parts.

1 Claim, 8 Drawing Sheets

ROLLING BEARING UNIT

BACKGROUND OF THE INVENTION

1. Field of the Invention

This invention relates to a rolling bearing unit that is desirably used in a location where there is high-speed minute rocking motion, such as for use in the swing arm of a magnetic disk apparatus.

2. Description of the Related Art

In a prior art rolling bearing unit for a swing arm, in the case of 3.5 "HDD" as shown in FIG. 15, ball bearings 100 with a grease sealed in them are used under a specified pre-load. An E block 200 is integrally formed with a swing arm or swing arms. As to the E block 200, mainly used are a pulling type in which a single bolt 400 is screwed into the central portion of the housing 300 for bolt-fastening, and an adhesion type, not shown in the figures, in which the outer-diameter side 301 of the housing 300 is adhesion-fixed to the inner peripheral surface of the E block 200.

In addition, mainly used in the case of 2.5 "HDD" as shown in FIG. 16 is an integration type which comprises press-formed flat plates 201 and spacers 500 each provided between a pair of the flat plates 201, which are fixed to the housing 300 between a flange portion of the housing 300 and a nut 600.

Recently, there is an increasing demand for higher density magnetic disk devices. In order to accomplish this, the track width on which signals are recorded on the disk have become increasingly more narrow, and there is a demand that the swing arm(s) installed in the head for reproducing the signals be capable of accessing the target track at high-speed and with highly precise positioning. A method of clamping a couple of disks for the pivot is developed in order to satisfy the demand, without using the housing.

Conventionally, as shown in FIG. 15, the housing 300 is pulled via the bolt 400 toward the E block 200 side at one location in the center of the outer-diameter side of the housing 300, so that the E block 200 is clamped through contact between the housing 300 and E block 200, which needs the member for the housing 300 and expensive.

In the case of the integration type shown in FIG. 16 where the arm 200 is directly mounted to the housing 300, flange processing or screw processing is required for the housing 300, which is expensive.

SUMMARY OF THE INVENTION

Taking the above problems with the prior art into consideration, an object of this invention is to provide a rolling bearing unit that does not use the housing to reduce the number of parts, and in which the are is precisely fixed to the pivot.

BRIEF DESCRIPTION OF THE DRAWINGS

Throughout the following figures, the left side is the head side and the right side is the voice coil motor (VCM) side.

DETAILED DESCRIPTION OF THE PREFERRED EMBODIMENTS

The preferred embodiments of the rolling bearing unit of this invention are explained below based on the drawings, where a pivot is rotatably supported by a first and second rolling bearings with reference to a fixed shaft, and where the material thickness of the outer race of the first rolling bearing is greater than the material thickness of the outer race of the second rolling bearing, so that the outer diameter of the first rolling bearing is different from the outer diameter of the second rolling bearing.

The following preferred embodiments are provided for explaining the rolling bearing unit of the invention, for use in the swing arm for the magnetic device such as the hard disk drive (HDD) where the swing arm 5 is rotatably supported by the pivot 1.

Incidentally, the invention is not limited to these embodiments, and other appropriate forms that are within the range of the invention can be selected.

First Embodiment

Figure 1:
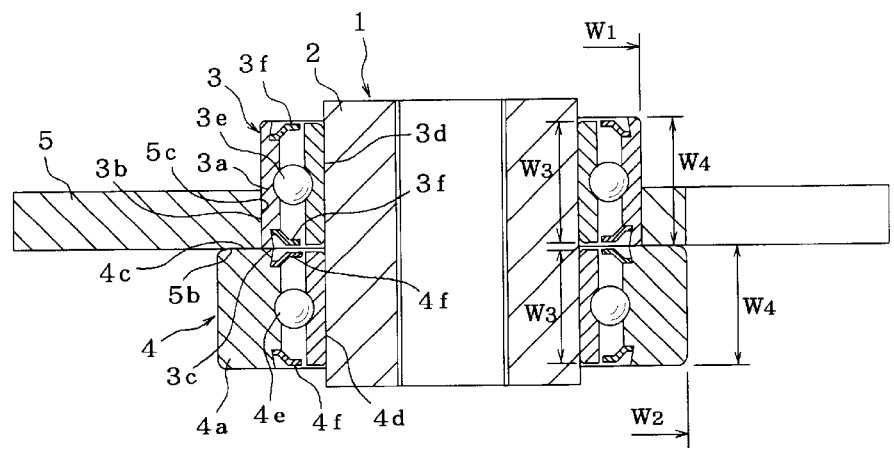
FIG. 1 is a vertical cross sectional view of a first embodiment of the rolling bearing unit according to the present invention.
Figure 2:
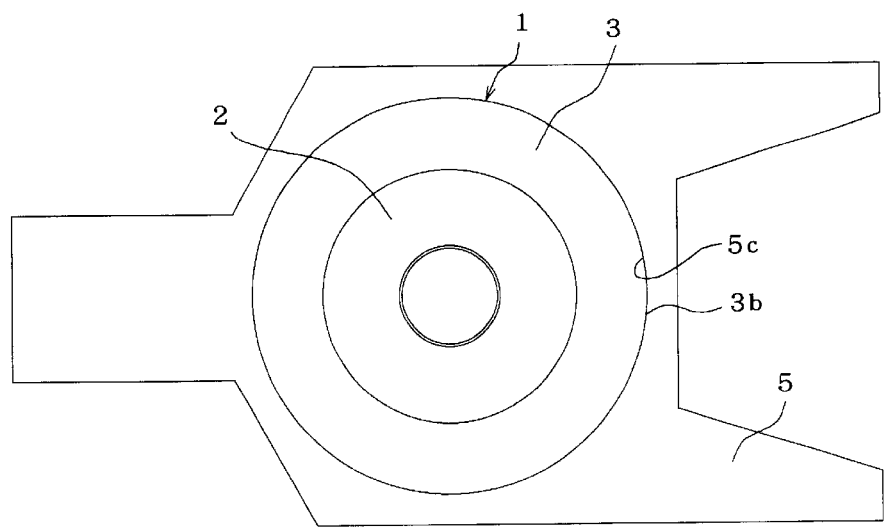
FIG. 2 is a top plan view of the first embodiment in FIG. 1.

In FIGS. 1 and 2, a pivot 1 comprises a shaft 2 and a first and second rolling bearings or ball bearings 4, 3 with different dimensions connected to the shaft 2 through adhesion or pressure-fitting such that the outer diameter of the first rolling bearing 4 is different from the outer diameter of the second rolling bearing 3. Specifically, the material thickness of the outer race 4a of the first rolling bearing 4 is greater than the material thickness of the outer race 3a of the second rolling bearing 3.

The first ball bearing 4 is disposed at a lower position and the second ball bearing 3 is disposed in an upper lower position. The material thickness (in the radial direction) of the outer race 4a of the lower or first ball bearing 4 is larger than the material thickness (in the radial direction) of the outer race 3a of the upper or second ball bearing 3, so that the outer diameter W2 of the first rolling bearing 4 is different from the outer diameter W1 of the second. The ratio in the material thickness of the upper and lower outer races 3a, 4a can be changed at a proper value within the scope of the present invention and not limited to the illustrated embodiments.

In the present embodiment, the width W3 (in the axial direction) of the inner races 3d, 4d is smaller than the width W4 (in the axial direction) of the outer race 3a, 4a, and the mating end surfaces 3c, 4c of the upper and lower ball bearings 3, 4 come into contact with each other.

As to the inner races 3d, 4d, balls 3e, 4e and seal or shield plates 3f, 4f of the upper and lower ball bearings 3, 4 in this embodiment, common members are used with the same bearing dimensions, and they can be changed within the scope of the present invention.

Since the upper and lower ball bearings 3, 4 are common in the inner races 3d, 4d and balls 3e, 4e, with the outer bearing diameter relation W1<W2, so that the outer race 4a of the lower ball bearing 4 is protruded radially from the outer race 3a of the upper ball bearing 3. Incidentally, the mating or inside seal plate 3f, 4f can be eliminated from the ball bearings 3, 4 to reduce the cost.

The swing arm 5 is formed by pressing in a proper shape, and mounted to the outer peripheral surface 3b of the outer race 3a of the upper ball bearing 3 and to the end surface 4c of the outer race 4a of the lower ball bearing 4, with the reference surface placed in the outer peripheral surface 3b of the outer race 3a of the upper ball bearing 3 and in the end surface 4c of the outer race 4a of the lower ball bearing 4.

In the figure, the head is placed on the left side while the voice coil motor (VCM) is placed in the right side.

The swing arm is made desirably from an aluminum alloy, which is easily press-processed, and can be made through forging, and selected from any proper materials, and formed in a proper shape in the scope of the present invention.

In addition, the swing arm 5 can be changed on design and is not limited to the illustrated shape. In the present invention, the swing arm 5 can be mounted with the reference surface placed in at least one of the outer peripheral surface of the bearing having a smaller outer diameter and in the end surface of the bearing having a larger outer diameter, although the reference surface is placed in both of the outer peripheral surface 3b and the end surface 4c in the illustrated figure.

When the pivot 1 is comprised of the combination of the ball bearings 3, 4 with different outer bearing diameters W1, W2 as in the present embodiment, the swing arm 5 can be mounted to the end surface 4c of the outer race 4a of the lower ball bearing 4 with the high precision of the right angle in the attitude of the swing arm 5 with respect to the outer peripheral surface 3b of the outer race 3a of the upper ball bearing 3 being in the order of 2 $\mu$m to 3 $\mu$m or less, on the basis that the precision of the right angle between the outer peripheral surface and the end surface of the outer race is up to 1 $\mu$m in the usual bearings.

Second Embodiment

Figure 3:
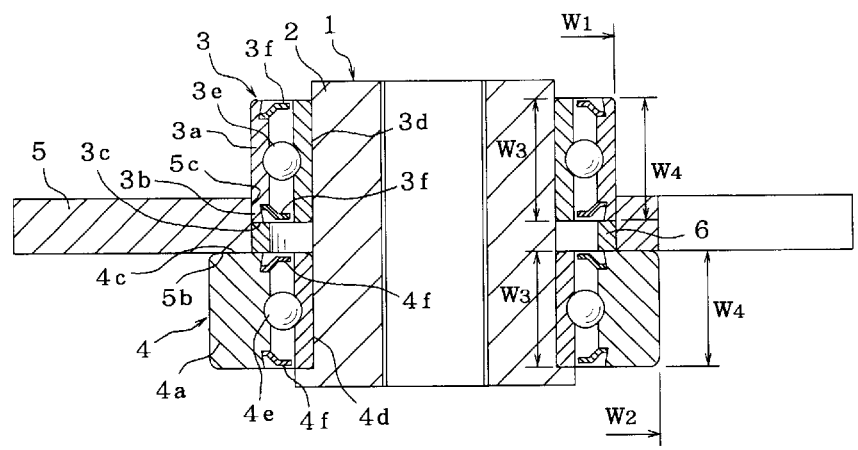
FIG. 3 is a vertical cross sectional view of a second embodiment of the rolling bearing unit according to the present invention.
Figure 4:
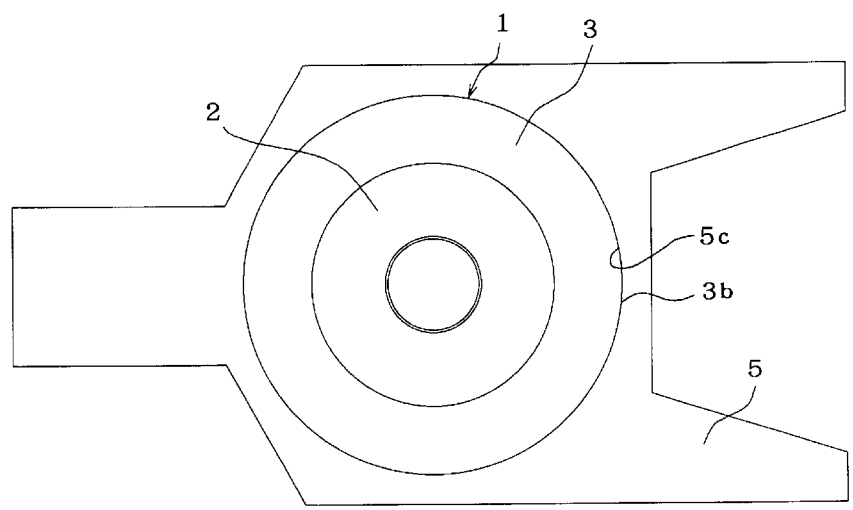
FIG. 4 is a top plan view of the second embodiment in FIG. 3.

The structure of the second embodiment in FIGS. 3 and 4 is substantially the same to that of the first embodiment except that a spacer 6 is disposed between the outer races 3a, 4a of the upper and lower ball bearings 3, 4.

The width W3 (in the axial direction) of the inner races 3d, 4d can be the same as the width W4 (in the axial direction) of the outer races 3a, 4a.

The outer diameter of the spacer 6 is a little smaller than the outer diameter of the upper ball bearing 3.

A flange (not illustrated) can be made to protrude radially at a lower portion of the shaft 2 to come into contact with the lower end surface of the lower ball bearing 4.

The outer members and functions are substantially the same to those of the first embodiment.

Third Embodiment

Figure 5:
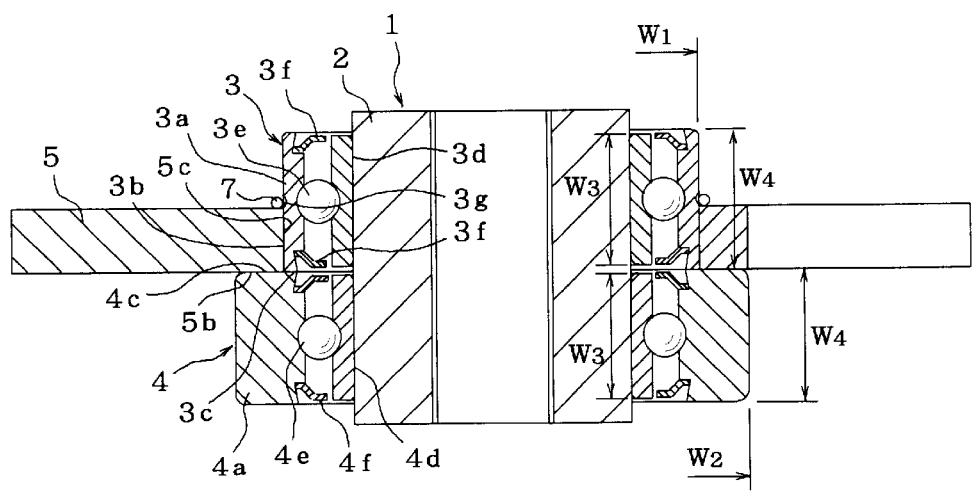
FIG. 5 is a vertical cross sectional view of a third embodiment of the rolling bearing unit according to the present invention.

The structure of the third embodiment in FIG. 5 is substantially the same to that of the first embodiment except that the swing arm 5 is fixed with an O-ring or wire 7 which is mounted to the circumferential groove 3g in the outer periphery of the outer race 3b of the upper ball bearing 3.

The material of the O-ring 7 is desirably fluorinated rubber for lower out-gas amount, although not limited to it. The diameter of the wire of the O-ring and the number of the O-rings provided are properly set. In addition, a spacer 6 (not shown) can be set between the outer races 3a, 4a as in the second embodiment.

The other members and functions are substantially the same to those of the first and second embodiments.

Fourth Embodiment

Figure 6:
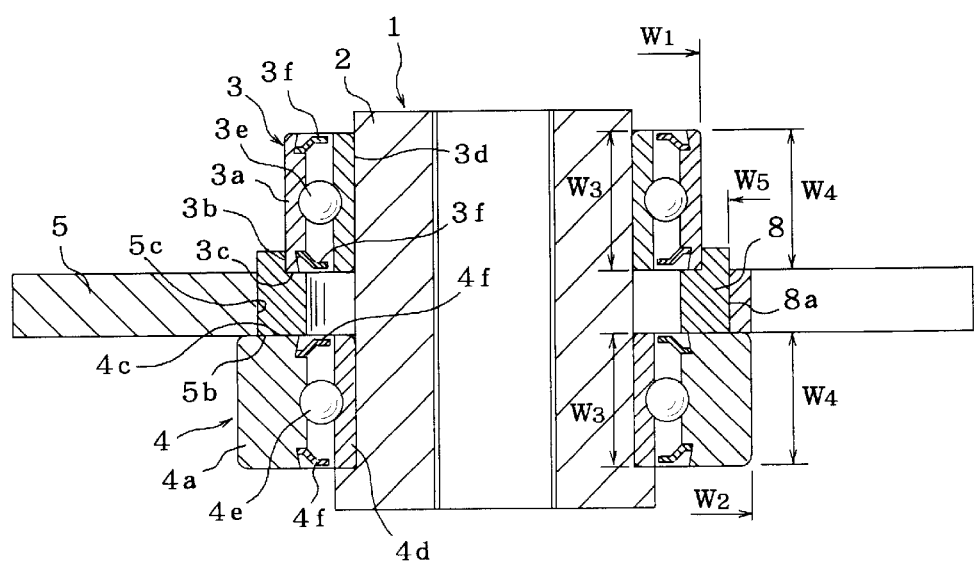
FIG. 6 is a vertical cross sectional view of a fourth embodiment of the rolling bearing unit according to the present invention.

The structure of the fourth embodiment in FIG. 6 is substantially the same to that of the second embodiment in that the spacer is used, but the size W5 of the outer diameter 8a of the spacer 8 is larger than the size W1 of the outer diameter of the upper ball bearing 3, so that the swing arm 5 is fitted and fixed onto the spacer 8. In this structure, the amount of out-gas is low because of no adhesive used for fixing.

The swing arm 5 can be made by burring process to make the fitting portion longer.

The width W3 (in the axial direction) of the inner race 3d, 4d can be the same to that W4 (in the axial direction) of the outer race 3a, 4a.

A flange (not illustrated) can be made to protrude in that axial direction at a lower portion of the shaft 2 to come into contact with the lower end surface of the lower ball bearing 4.

The other members and functions are substantially the same to those of the first embodiment.

Fifth Embodiment

Figure 7:
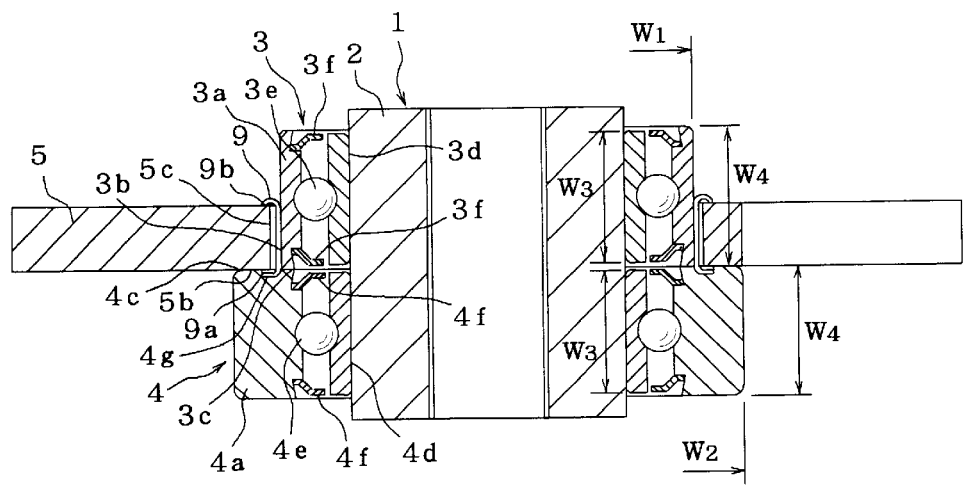
FIG. 7 is a vertical cross sectional view of a fifth embodiment of the rolling bearing unit according to the present invention.

The structure of the fifth embodiment in FIG. 7 is substantially the same to that of the first embodiment, and a washer 9 is used to fix the swing arm 5.

The end surface 4c of the outer race 4a of the lower ball bearing 4 is formed with a circumferential groove 4g to which the lower end 9a of the washer 9 bent in an angle shape is mounted. The washer 9 extends in the axial direction of the outer peripheral surface 3b of the outer race 3a of the upper ball bearing 3, and its upper end 9b is previously a little bent. The inner diameter 5c of the swing arm 5 is made larger than the outer diameter of the washer 9 to mount the swing arm 5 to the pivot 1. After the swing arm 5 is mounted to the pivot 1, the upper end 9b of the washer 9 is further bent toward the upper surface of the swing arm 5 to press-fit the swing arm 5 to the pivot 1 for fixing. The press fitting of the washer 9 can be generally along the circumference or made at several locations through crimping.

Sixth Embodiment

Figure 8:
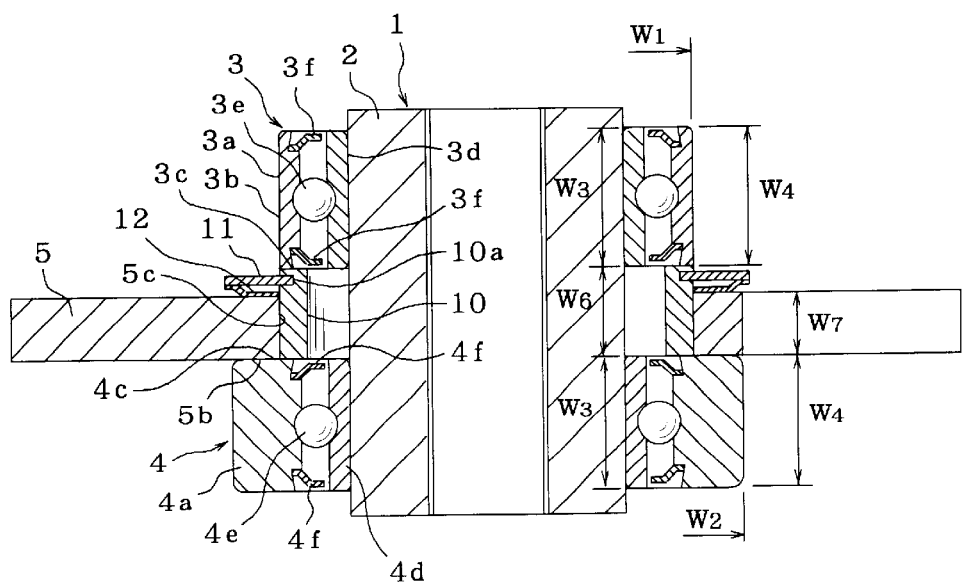
FIG. 8 is a vertical cross sectional view of a sixth embodiment of the rolling bearing unit according to the present invention.

The structure of the sixth embodiment in FIG. 8 is similar to that of the second embodiment in that a spacer 10 is used, but the spacer 10 used in this embodiment is radially larger than the spacer 6 in the second embodiment and provided between the outer race 3a of the upper ball bearing 3 and the outer race 4a of the lower ball bearing 4. In addition, the swing arm 5 is fixed by way of a washer 11 and a stop ring 12.

The width W6 in the axial direction of the spacer 10 is larger than the material thickness W7 in the axial direction of the swing arm 5.

Specifically, a ring-shaped groove 10a is formed in the outer periphery of the spacer 10. After the swing arm 5 is mounted to the end surface 4c of the outer race 4a of the lower ball bearing 4, the washer 11 is installed and then the stop ring 12 is fitted into the ring-shaped groove 10a to fix the swing arm 5 to the pivot 1.

The other members and functions are substantially the same to those of the first and second embodiments.

Seventh Embodiment

Figure 9:
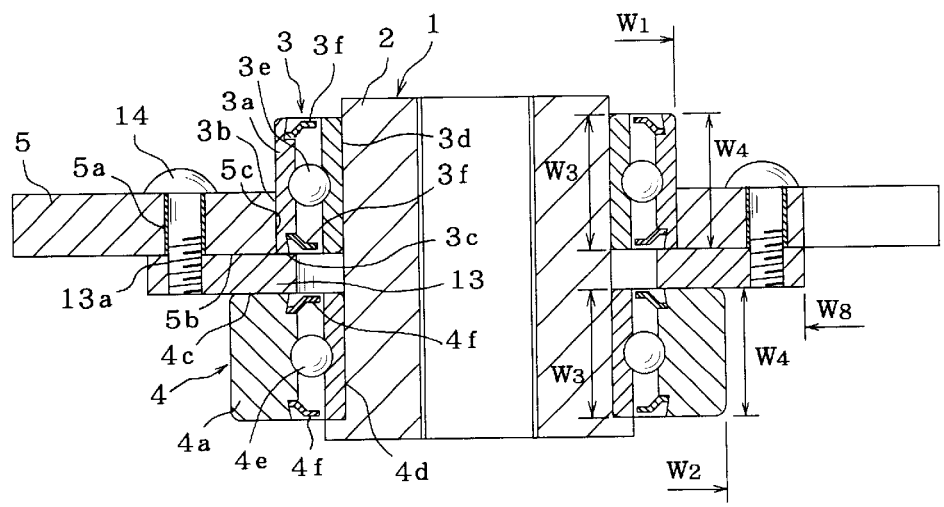
FIG. 9 is a vertical cross sectional view of a seventh embodiment of the rolling bearing unit according to the present invention.

The structure of the seventh embodiment in FIG. 9 is similar to that of the second embodiment in that a spacer 13 is used, but in this embodiment the swing arm 5 is bolt-connected to the spacer 13.

Specifically, the outer diameter W8 of the spacer 13 is larger than the outer diameter W2 of the lower ball bearing 4. In addition, the spacer 13 is formed with axially extending bolt holes 13a at several locations, such that the bolt holes 5a axially extending through the swing arm 5 are aligned with the bolt holes 13a of the spacer 13, so that the swing arm 5 is mounted to the end surface of the spacer 13. And then the bolt 14 is tightened to clamp the swing arm 5. The number of the locations for bolt clamping is properly set and not limited.

The other members and functions are substantially the same to those of the first and second embodiments.

Eighth Embodiment

Figure 10:
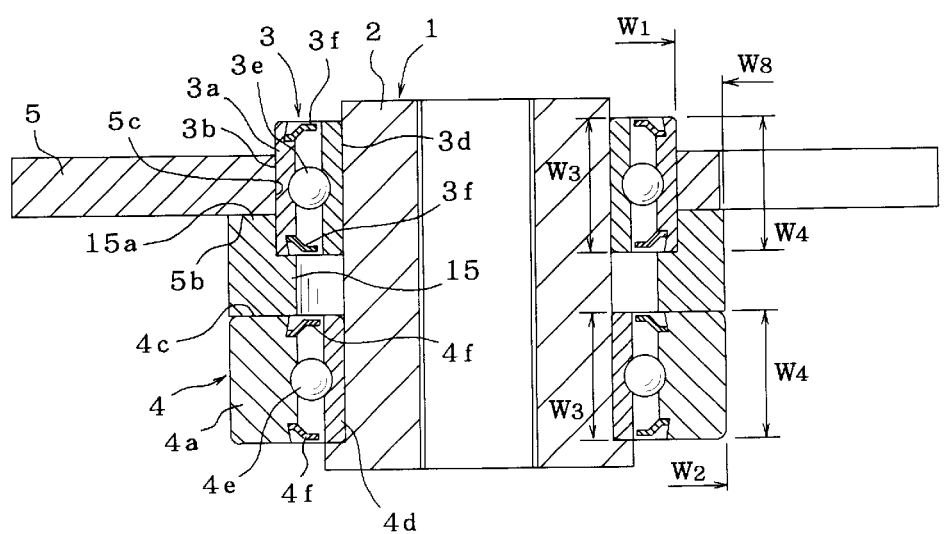
FIG. 10 is a vertical cross sectional view of an eighth embodiment of the rolling bearing unit according to the present invention.

The structure of the eighth embodiment in FIG. 10 is similar to that of the second embodiment in that a spacer 15 is used, but the shape of the spacer 15 is changed in this embodiment and the axial location of the swing arm 5 is changed.

Specifically, the outer diameter W8 of the spacer 15 is the same to the outer diameter W1 of the lower ball bearing 4, and the upper end surface of the spacer 15 is circumferentially formed with a flange 15a which comes into contact with the outer periphery 3b of the outer race 3a of the upper ball bearing 3.

In addition, the lower surface 5b of the swing arm 5 is bonded to the end surface of the flange 15a of the spacer 15, and the inner periphery 5c of the swing arm 5 is bonded to the outer periphery 3b of the outer race 3a of the upper ball bearing 3 to mount the swing arm 5 to the pivot 1.

Accordingly, with the location relationship with the disk surface, the location of the swing arm 5 can easily changed only by way of the change in shape of the spacer 15.

Incidentally, the axial thickness and radial thickness of the flange 15a of the spacer 15 can properly be changed on design.

The other members and functions are substantially the same to those of the first and second embodiments.

Ninth Embodiment

Figure 11:
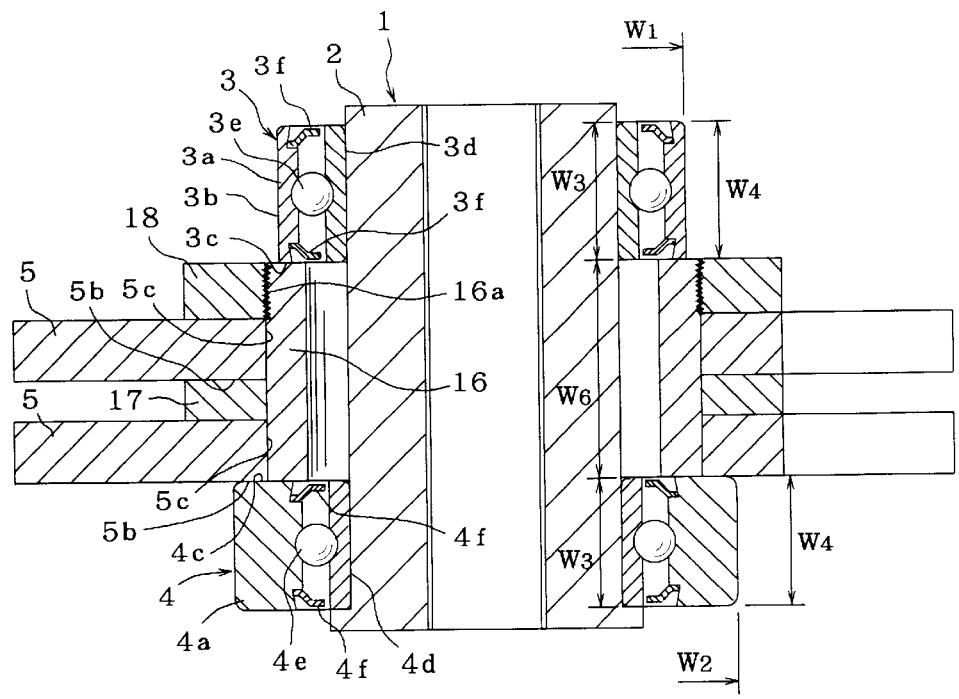
FIG. 11 is a vertical cross sectional view of a ninth embodiment of the rolling bearing unit according to the present invention.

A plurality of swing arms 5 are fixed in this embodiment in FIG. 11.

The spacer 16 for the pivot is provided between the outer race 3a of the upper ball bearing 3 and the outer race 4a of the lower ball bearing 4, and the axial length (spacer width) W6 of the spacer 16 is longer, and the upper portion of the outer periphery is threaded. The axial length (spacer width) W6 of the spacer 16 for the pivot can properly be changed on design corresponding to the number of the swing arms 5. In addition, the radial width is properly set, too.

Then, the two swing arms 5 are integrated with a spacer 17 in the arm gap between them. Finally, a nut 18 is tightened to the thread portion 16a of the pivot spacer 16, so that the swing arms 5 are integrally fixed.

According to the present embodiment, the number of parts is smaller than that of the conventional integrated type, and assembling is made with higher precision.

The other members and functions are substantially the same to those of the first and second embodiments.

Tenth Embodiment

Figure 12:
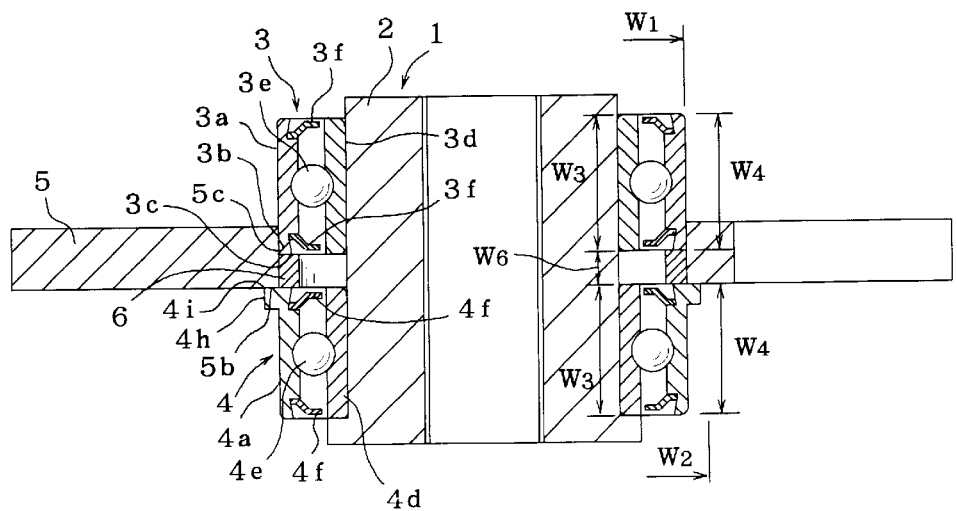
FIG. 12 is a vertical cross sectional view of a tenth embodiment of the rolling bearing unit according to the present invention.
Figure 13:
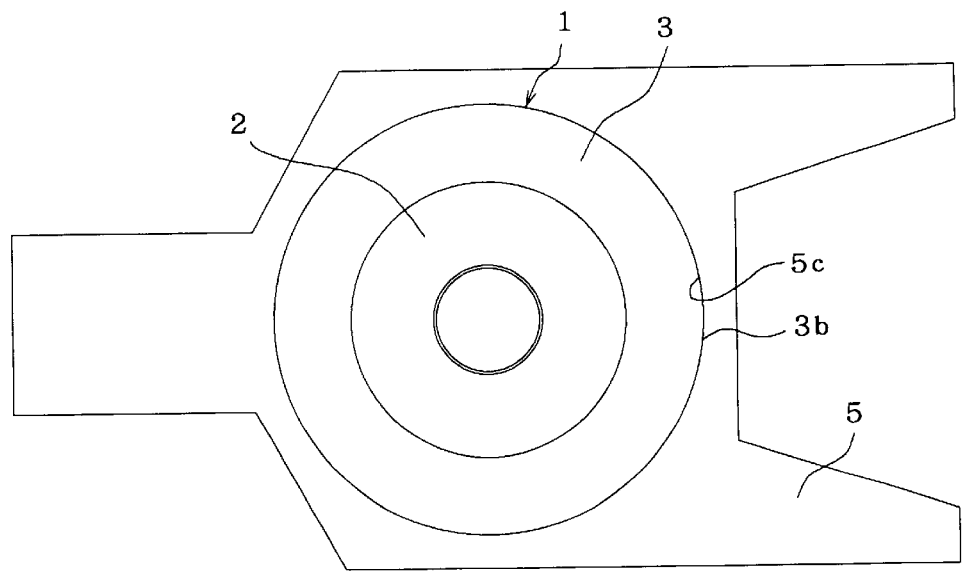
FIG. 13 is a top plan view of the tenth embodiment in FIG. 12.

The structure of the eighth embodiment in FIGS. 12 and 13 is similar to that of the second embodiment in that a spacer 6 is used, but the outer race 4a of the lower ball bearing 4 in this embodiment is formed with a large flange 4h on its end surface facing to the spacer 6. In addition, the outer diameter W2 of the outer race 4a is larger than the outer diameter W1 of the upper ball bearing 3.

The swing arm 5 is bonded to the end surface 4i of the flange 4h of the outer race 4a and to the outer periphery 3b of the outer race 3a of the upper ball bearing 3, so that the swing arm 5 is mounted to the pivot 1. The outer diameter (axial length) and axial thickness etc. of the flange 4h are properly set.

The case where the structure of the outer race 4a of the lower ball bearing 4 according to the present embodiment is adopted, is compatible with the first embodiment where the spacer 6 is not used.

The other members and functions are substantially the same to those of the first and second embodiments.

Eleventh Embodiment

Figure 14:
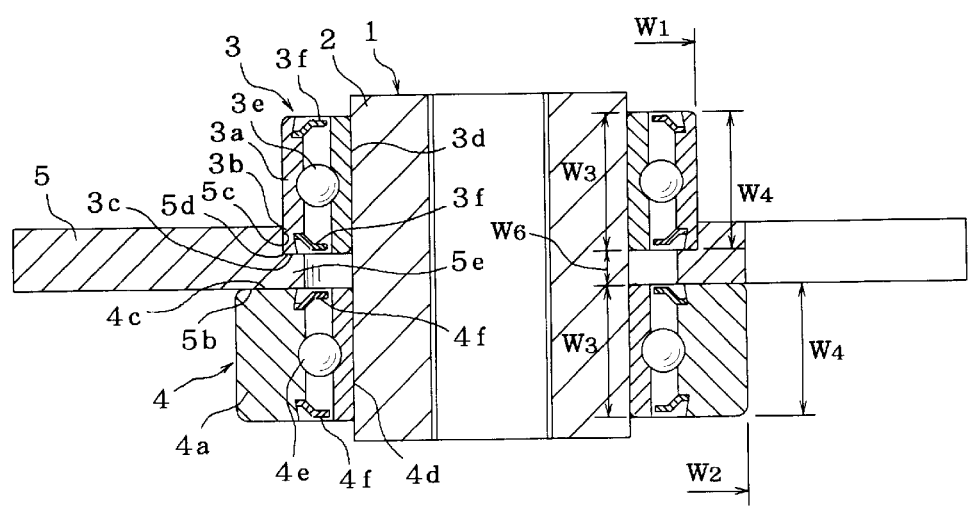
FIG. 14 is a vertical cross sectional view of an eleventh embodiment of the rolling bearing unit according to the present invention.
Figure 15:
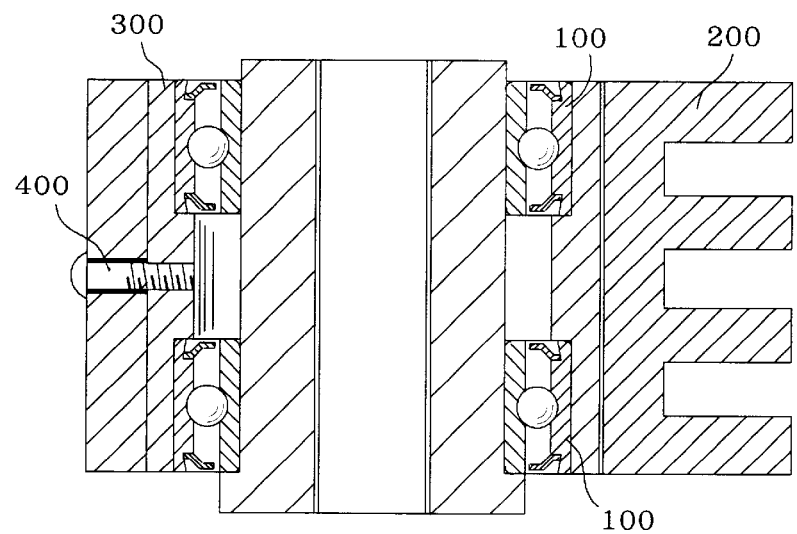
FIG. 15 is a vertical cross sectional view of a prior art rolling bearing unit of the bolt-fastening type (pulling type) of swing arm in the case of the 3.5 "HDD".
Figure 16:
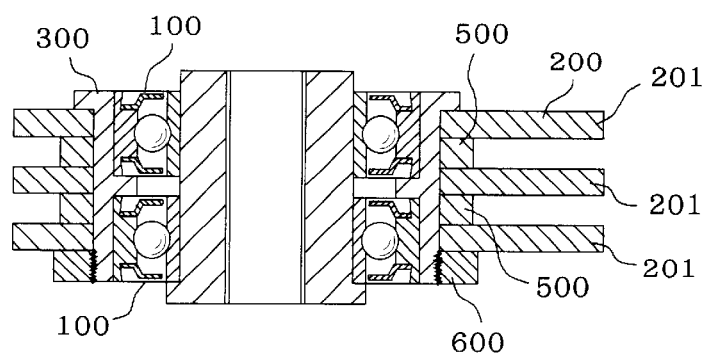
FIG. 16 is a vertical cross sectional view of a prior art rolling bearing unit of the integration type of press-fitted swing arm in the case of the 2.5 "HDD".

Part of the swing arm 5 is used as a spacer in this embodiment in FIG. 14.

Specifically, in this embodiment, a step portion 5d is formed in an upper portion of the inner periphery 5c of the swing arm 5, and a spacer-like projection 5e is formed circumferentially, the spacer-like projection 5e is disposed between the outer race 3a of the upper ball bearing 3 and the outer race 4a of the lower ball bearing 4.

In this embodiment, the swing arm 5 is installed for the spacer in the pivot 1, so that no adhesion-bonding is required and the amount of out-gas is smaller.

The axial length (spacer width) W6 and radial thickness etc. of the spacer-like projection 5e are properly selectively set.

The other members and functions are substantially the same to those of the first embodiment.

Incidentally, the present embodiment can be applied to the case where a plurality of swing arms 5 as in the ninth embodiment are fixed. For example, a spacer-like projection longer in the axial direction like the pivot spacer 16 in the ninth embodiment can be provided, so that the arms 5 are integrally formed in the axial direction with a proper gap on the radially outer side of the spacer-like projection.

With the present invention where the swing arm is connected to the pivot rotatably supported with reference to the fixed shaft by way of the bearings, the bearings with different outer bearing diameters are combined with each other such that the outer race of one of the bearings has a larger material thickness than the outer race of the other. Accordingly, no housing is used, the end surface of the outer race having the larger diameter and the outer periphery of the other bearing are used for a reference surface to connect the swing arm(s) to the pivot with higher precision. Because of no housing used, the number of parts is reduced and processing work for the housing is eliminated, resulting in cost reduction.

What is claimed is:

1. A rolling bearing unit comprising:

first and second rolling bearings in combination for rotatably supporting a swing arm with reference to a fixed shaft, the first rolling bearing having a first outer race with a first material thickness, the second rolling bearing having a second outer race with a second material thickness, the first material thickness of the first outer race being greater than the second material thickness of the second outer race, so that the outer diameter of the first rolling bearing is different from the outer diameter of the second rolling bearing, and wherein the swing arm is borne by the first outer race.

* * * * *